(12) United States Patent
Gotzig et al.

(10) Patent No.: US 6,906,640 B2
(45) Date of Patent: Jun. 14, 2005

(54) METHOD FOR OPERATING A PARKING ASSISTANCE SYSTEM

(75) Inventors: Heinrich Gotzig, Heilbronn (DE); Nicolas Jecker, Esslingen (DE); Dietmar Grüdl, Sachsenheim (DE); Miguel Hurtado, West Lafayette, IN (US)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 10 days.

(21) Appl. No.: 10/422,833

(22) Filed: Apr. 25, 2003

(65) Prior Publication Data

US 2003/0210157 A1 Nov. 13, 2003

(30) Foreign Application Priority Data

May 8, 2002 (DE) .......................................... 102 20 426

(51) Int. Cl.$^7$ ................................................. B60Q 1/48
(52) U.S. Cl. ..................... 340/932.2; 340/436; 340/437; 180/271; 701/36
(58) Field of Search ............................. 340/932.2, 436, 340/437, 933, 958, 435; 180/271; 701/36

(56) References Cited

U.S. PATENT DOCUMENTS 6,061,002 A * 5/2000 Weber et al. ............ 340/932.2
6,147,624 A * 11/2000 Clapper ................... 340/932.2
6,483,429 B1 * 11/2002 Yasui et al. ................ 340/435
6,683,539 B2 * 1/2004 Trajkovic et al. ........ 340/932.2

FOREIGN PATENT DOCUMENTS

| | | | |
|---|---|---|---|
| DE | 3830747 A1 * | 9/1988 | .............. 340/932.2 |
| DE | 38 13 083 | 11/1989 | |
| DE | 38 27 729 | 3/1990 | |
| DE | 38 44 340 | 7/1990 | |
| DE | 297 18 862 | 2/1998 | |
| DE | 197 45 127 | 4/1999 | |
| DE | 198 09 416 | 9/1999 | |
| DE | 197 03 517 | 5/2001 | |
| FR | 2 785 383 | 5/2000 | |
| JP | 409109865 | * 4/1997 | .............. 340/932.2 |

* cited by examiner

*Primary Examiner*—Anh V. La
(74) *Attorney, Agent, or Firm*—Paul Vincent

(57) ABSTRACT

A method for operating a parking assistance system and a parking assistance system for a vehicle, is characterized by the following steps: a) determination of the length and/or width of a parking space when passing the parking space; b) determination of at least one feasible parking process for the vehicle for entering into or exiting the parking space; c) instructing the driver as to which direction the vehicle shall be moved and how far the steering wheel must be turned, and d) automatic braking and/or acceleration of the vehicle during the parking process into or out of a parking space, wherein steps c) and d) can be effected in any order, one after the other and/or at the same time.

20 Claims, 1 Drawing Sheet

METHOD FOR OPERATING A PARKING ASSISTANCE SYSTEM

This application claims Paris Convention priority of DE 102 20 426.8 filed May 8, 2002 the complete disclosure of which is hereby incorporated by reference.

BACKGROUND OF THE INVENTION

The invention concerns a method for operating a parking assistance system for entering and exiting a parking space and a parking assistance system for a vehicle.

Such systems are disclosed e.g. in DE 297 18 862. The use of such systems has shown that parking remains difficult even when instructions are given to the driver. In particular, simultaneous actuation of the steering wheel and acceleration or braking of the vehicle according to instructions poses problems.

It is therefore the underlying purpose of the present invention to provide a method for operating a parking assistance system for entering and exiting a parking space and a corresponding parking assistance system which improves, facilitates and provides for safe parking.

SUMMARY OF THE INVENTION

This object is achieved by a method, which is characterized by the following steps:

a) determination of the length and/or width of a parking space;

b) determination of at least one feasible parking process for the vehicle to enter or exit the parking space;

c) instructing the driver to move the vehicle in a given direction and how far and in which direction the steering wheel must be turned; and d) automatic braking or optionally acceleration of the vehicle when entering and/or exiting a parking space, wherein the steps c) and d) can be effected sequentially in any order and/or simultaneously.

The automatic braking or acceleration of the vehicle in the described method advantageously allows the driver to concentrate on steering. The driver is informed whether the vehicle shall be moved forwards or backwards and how far the steering wheel must be turned into the corresponding direction. Turning of the steering wheel to its maximum is not absolutely necessary. This method is particularly advantageous in connection with an automatic transmission. Towards this end, the driver may completely avoid acceleration since the automatic transmission drives the vehicle forward even when the accelerator is not actuated. The driver must merely follow the instructions concerning turning of the steering wheel.

The length and/or width of the parking space can be determined e.g. when slowly passing the parking space. After the vehicle has been parked, the length and/or width of the parking space can be detected while the vehicle is standing in the parking space.

A feasible parking procedure results from the required turning of the steering wheel and the associated speed along the path to be traveled.

One advantageous method results when step b) is carried out simultaneously with step c) and d) and when new feasible parking processes are determined in step b) in dependence on the previous parking process or on the respective current vehicle position. In accordance with the invention, the steering angle change required to obtain ideal parking of the vehicle is determined in dependence on the instantaneous steering wheel angle and the vehicle speed. The spatial dimensions of the vehicle, separations from objects surrounding the parking space, the rotation of the steering wheel, speed and/or the respective current vehicle position and, if necessary, further, in particular vehicle-specific values are advantageously taken into consideration in determining the parking process.

The driving speed and/or the distance traveled and/or the steering wheel travel are preferably taken into consideration to track the parking process.

One further, particularly preferred embodiment of the invention provides that, during the parking process, not only automatic braking and/or acceleration of the vehicle is effected but the vehicle is also automatically controlled. This embodiment is advantageous in that the driver must neither brake nor actuate the steering wheel, thereby ensuring ideal parking.

The force to be used for braking the vehicle advantageously depends on or is proportional to the difference $\Delta\phi$ between the predetermined angle of the steering wheel and the actual angle of the steering wheel. If the driver turns the steering wheel as is prescribed, the braking force may be reduced, i.e. the vehicle can be parked more rapidly. If the instantaneous steering wheel angle differs from the predetermined steering wheel angle, the parking process is not optimum. Braking of the vehicle must be increased to be able to perform the required corrections during the parking process.

In a further advantage in accordance with the invention, the braking force depends on or is proportional to the separation $\Delta d$ of the vehicle from an object located in the traveling direction. If the separation is relatively large, the vehicle speed may be higher than when the vehicle is very close to an object limiting the parking space.

It is particularly advantageous when the braking force is proportional to $$F_B \sim \left(\Delta\varphi \cdot e^{c1 \cdot \Delta\varphi} + \frac{1}{\Delta d} \cdot e^{c2 \cdot \Delta d}\right)$$

This braking force meets the requirements of the parking process in an optimum fashion.

The braking force may moreover depend on the speed with which the steering wheel is turned. If the steering wheel is actuated only very slowly, the braking force is preferably higher than when the steering wheel is turned quickly.

The above-mentioned object is also achieved by a computer program, which is suited for carrying out the inventive method when executed by a control and/or regulating device. The computer program is preferably stored, in particular, in a flash memory.

The above-mentioned object is also achieved by a control and/or regulating device for operating a parking assistance system which is suited for control and/or regulation of the inventive method.

The above-mentioned object is also achieved by a parking assistance system for a vehicle for entering and leaving a parking space, comprising at least one distance sensor, a travel measuring and/or speed measuring sensor, a turning angle measuring sensor, a control and/or regulating device coupled to the sensor for data evaluation and for control and/or regulation of a braking and/or acceleration system and for control and/or regulation of a communication means for communicating instructions to the driver, wherein the parking assistance system is suited for carrying out the inventive method.

Further advantageous embodiments and details of the invention can be extracted from the following description which describes and explains the invention in further detail with reference to the embodiment shown in the drawing.

DESCRIPTION OF THE PREFERRED EMBODIMENT

Figure 1:
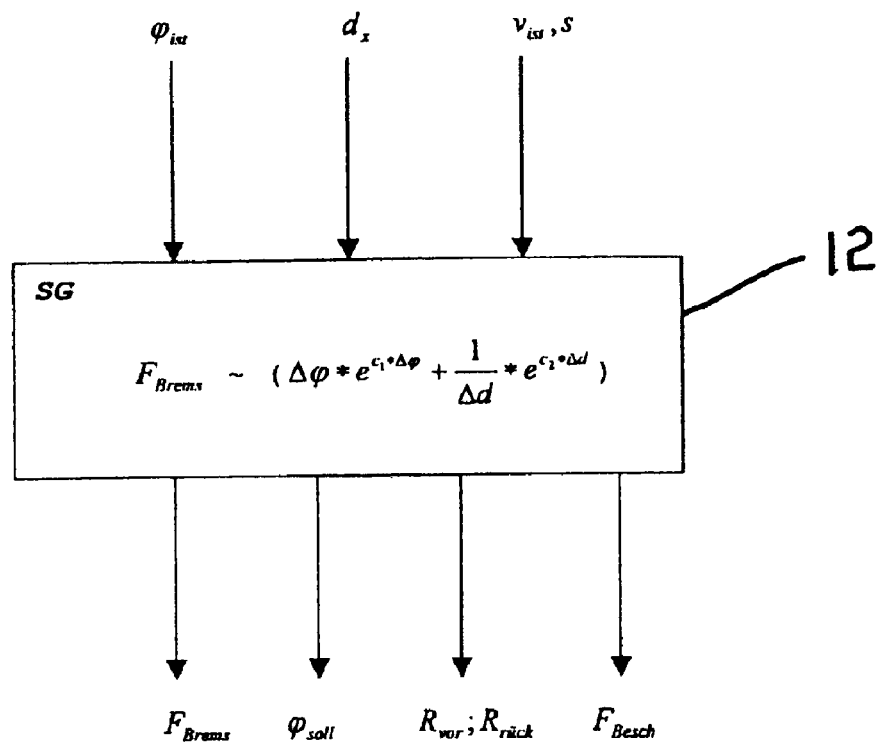
FIG. 1 schematically shows an inventive parking assistance system 10.

The parking assistance system comprises a central control device 12 which has various input and output values. Input values of the control device 12 are e.g. the actual steering angle $\phi_{ist}$, various separations $d_s$ of the vehicle from objects limiting the parking space, the speed of the vehicle $V_{ist}$ and the distance S traveled by the vehicle. The steering angle $\phi_{ist}$ is communicated to the control device via a steering angle sensor. The various separations $d_s$ are transmitted to the control device 12 by distance sensors, provided on the vehicle or from a surrounding detecting system. The speed $V_{ist}$ or the distance S traveled by the vehicle is detected by means of a speed sensor or a distance-measuring sensor.

Output values of the control device 12 are e.g. a value $F_{Brems}$ proportional to the braking force, which is provided for controlling a braking system, and the steering angle $\phi_{soll}$ which is required to obtain an optimum parking process. A further output value of the control device is the direction in which the driver moves the vehicle, namely $R_{vor}$ for forwards and $R_{rück}$ for backwards. An output value may be a value $F_{Besch}$ that serves for controlling an acceleration system to obtain a feasible acceleration of the vehicle.

When the vehicle passes a parking space, the length and/or width of the parking space is determined. Towards this end, distance measuring sensors or a vehicle environment detecting system may be provided on the vehicle. In a subsequent step, feasible parking processes for parking the vehicle in the parking space are determined on the basis of the position of the vehicle relative to the parking space.

In a subsequent step, the driver is instructed in which direction $R_{vor}$, $R_{rück}$ the vehicle must be moved and in which direction and how far the steering wheel $\phi_{soll}$ must be turned. The output values $\phi_{soll}$ and $R_{vor}$, $R_{rück}$ are communicated to the driver via a communication device (not shown). Communication can be acoustical, visual or tactile.

During the parking process, the instantaneous steering wheel $\phi_{ist}$ angle and the associated vehicle speed $V_{ist}$ are used to determine how the steering angle $\phi_{soll}$ must subsequently be changed to ideally park the vehicle. The value $\phi_{soll}$ is communicated to the driver.

During the parking process, the vehicle is braked automatically via the output value $F_{Brems}$ at a suitable point in time. Advantageously, the driver does not have to actuate the brake during the parking process. To prevent hitting an object limiting the parking space when the speed is too high during the parking process or when driving too closely to a standing vehicle, the control device can use the output value $F_{Brems}$ to brake hard or also stop the vehicle to be parked. The value $F_{Brems}$ is thereby proportional to or dependent on the value $\Delta\phi$, which is the difference between the predetermined angle of the steering wheel $\phi_{soll}$ and the actual angle of the steering wheel $\phi_{ist}$. $F_{Brems}$ is moreover proportional to or dependent on the value $\Delta d$, which represents the separation of the vehicle from an object disposed in the traveling direction. In particular:

$$F_B \sim \left( \Delta\varphi \cdot e^{c1 \cdot \Delta\varphi} + \frac{1}{\Delta d} \cdot e^{c2 \cdot \Delta d} \right)$$

By expanding the two exponentials about $\Delta\phi=0$ and $\Delta d=0$ respectively, one sees that the braking force decreases linearly for small decreasing $\Delta\phi$ and increases inversely with $\Delta d$ for small decreasing $\Delta d$. The respective non-linear terms in the exponential function expansions govern the behavior of the braking force at large values of $\Delta\phi$ and $\Delta d$, in dependence on the signs and magnitudes of the constants C1 and C2

To determine the planned parking process, further input values, in particular vehicle-specific input values, may be provided. The control device SG can comprise further output values for facilitating the parking process.

All the features shown in the description, the following claims and the drawing may be essential to the invention either individually as well as in arbitrary combination.

We claim:

1. A method for operating a driver parking assistance system for driving a vehicle into and out of a parking space, the method comprising the steps of:
   a) determining at least one of a length and width of the parking space;
   b) determining at least one feasible parking process for the vehicle for entering into or exiting the parking space;
   c) instructing the driver as to which direction the vehicle should be driven and in which direction and how far a steering wheel must be turned; and
   d) automatically braking or accelerating the vehicle during the parking process into or out of the parking space, wherein steps c) and d) can be effected in any sequence and/or simultaneously, wherein a braking force increases with an inverse of a distance $\Delta d$ between the vehicle and an object disposed in a traveling direction, as the vehicle approaches the object.

2. The method of claim 1, wherein the braking force decreases non-linearly for increasing values of $\Delta d$.

3. The method of claim 2, wherein the braking force is given by $$F_B \sim + \frac{1}{\Delta d} \cdot e^{c2 \cdot \Delta\varphi}$$

wherein C2 is a constant.

4. A method for operating a driver parking assistance system for driving a vehicle into and out of a parking space, the method comprising the steps of:
   a) determining at least one of a length and width of the parking space;
   b) determining at least one feasible parking process for the vehicle for entering into or exiting the parking space;
   c) instructing the driver as to which direction the vehicle should be driven and in which direction and how far a steering wheel must be turned; and
   d) automatically braking or accelerating the vehicle during the parking process into or out of the parking space, wherein steps c) and d) can be effected in any sequence and/or simultaneously, wherein a braking force decreases linearly with a difference $\Delta\phi$ between a predetermined angle of the steering wheel and an actual angle of the steering wheel as the actual angle approaches the predetermined angle.

5. The method of claim 4, wherein the braking force increases non-linearly for increasing values of $\Delta\phi$.

6. The method of claim 5, wherein the braking force is given by $$F_B \sim \Delta\phi \cdot e^{c1 \cdot \Delta\phi}$$

wherein C1 is a constant.

7. A method for operating a driver parking assistance system for driving a vehicle into and out of a parking space, the method comprising the steps of:
   a) determining at least one of a length and width of the parking space;
   b) determining at least one feasible parking process for the vehicle for entering into or exiting the parking space;
   c) instructing the driver as to which direction the vehicle should be driven and in which direction and how far a steering wheel must be turned; and
   d) automatically braking or accelerating the vehicle during the parking process into or out of the parking space, wherein steps c) and d) can be effected in any sequence and/or simultaneously, wherein a braking force decreases linearly with a difference $\Delta\phi$ between a predetermined angle of the steering wheel and an actual angle of the steering wheel as the actual angle approaches the predetermined angle and increases with an inverse of a distance $\Delta d$ between the vehicle and an object disposed in a traveling direction as the vehicle approaches the object.

8. The method of claim 7, wherein the braking force decreases non-linearly for large distances $\Delta d$ and increases non-linearly for large values of $\Delta\phi$.

9. The method of claim 7, wherein step b) is carried out at a same time as steps c) and d), and step b) determines new feasible parking processes in dependence on a previous parking development and/or on a respective current vehicle position.

10. The method of claim 7, wherein spatial dimensions of the vehicle, distances to objects surrounding the parking space, an angle of the steering wheel, a speed and/or a respective current vehicle position are taken into consideration for determining the parking process.

11. The method of claim 7, wherein a speed traveled, a path followed, and/or a steering wheel motion are taken into consideration to track the parking process.

12. The method of claim 7, wherein the vehicle is automatically controlled during the parking process.

13. The method of claim 8, wherein the braking force $F_B$ is proportional to $$F_B \sim \left( \Delta\varphi \cdot e^{c1 \cdot \Delta\varphi} + \frac{1}{\Delta d} \cdot e^{c2 \cdot \Delta d} \right)$$

wherein c1 and c2 are constants.

14. The method of claim 7, wherein the braking force $F_B$ depends on a speed with which the steering wheel is turned.

15. A computer readable medium suited for carrying out the method of claim 7, when performed by a control and/or regulating device.

16. The computer readable medium of claim 15, wherein it is stored in a memory.

17. The computer readable medium of claim 16, wherein said memory is a flash-memory.

18. A control and/or regulating device for operating a parking assistance system, the device suited for controlling and/or regulating the method of claim 7.

19. A parking assistance system for driving a vehicle into and out of a parking space, the system comprising at least one distance measuring sensor, a travel measuring sensor, a speed measuring sensor, a steering angle measuring sensor, a control and/or regulating device connected to said sensors for data evaluation, control and/or regulation of a braking and/or acceleration system and for control and/or regulation of a communication means for communicating instructions to the driver, wherein the parking assistance system is suited for carrying out the method of claim 7.

20. A method for operating a driver parking assistance system for driving a vehicle into and out of a parking space, the method comprising the steps of:
   a) determining at least one of a length and a width of the parking space;
   b) determining at least one feasible parking process for the vehicle for entering into or exiting the parking space;
   c) instructing the driver as to which direction the vehicle should be driven and in which direction and how far a steering wheel must be turned; and
   d) automatically braking or accelerating the vehicle during the parking process into or out of the parking space, with steps c) and d) being effected in any sequence and/or simultaneously, wherein a braking force ($F_B$) depends on a speed with which the steering wheel is turned.

* * * * *